US009612848B2

(12) United States Patent
Rosado et al.

(10) Patent No.: US 9,612,848 B2
(45) Date of Patent: Apr. 4, 2017

(54) SYSTEMS AND METHODS FOR GATHERING AND PROCESSING USER FEEDBACK

(75) Inventors: Paulo Alexandre Grilo Rosado, Alges (PT); Carlos Manuel Gregório Alves, Lisbon (PT); Gonçalo Bruno Alberto da Veiga, Odivelas (PT); Paulo José Ferro Tavares, Lisbon (PT); Lúcio Emanuel Represas Ferrão, Linda-a-Velha (PT); Nuno Filipe Campante Cervalho de Ferreira Teles, Lisbon (PT); Rodrigo Leal de Faria de Sousa Coutinho, Linda-a-Velha (PT)

(73) Assignee: OutSystems—Software em Rede S.A., Linda-a-Velha (PT)

( * ) Notice: Subject to any disclaimer, the term of this patent is extended or adjusted under 35 U.S.C. 154(b) by 2668 days.

(21) Appl. No.: 12/143,423

(22) Filed: Jun. 20, 2008

(65) Prior Publication Data

US 2008/0320445 A1    Dec. 25, 2008

Related U.S. Application Data

(60) Provisional application No. 60/946,078, filed on Jun. 25, 2007.

(51) Int. Cl.
*G06F 3/048* (2013.01)
*G06F 9/44* (2006.01)
*G06F 17/30* (2006.01)
*G06Q 10/10* (2012.01)

(52) U.S. Cl.
CPC ........... *G06F 9/4446* (2013.01); *G06Q 10/10* (2013.01); *G06F 17/3089* (2013.01)

(58) Field of Classification Search
USPC ......................................................... 717/110
See application file for complete search history.

(56) References Cited

U.S. PATENT DOCUMENTS

| 6,405,364 | B1 | 6/2002 | Bowman-Amuah |
| 6,718,258 | B1 | 4/2004 | Barton |
| 2002/0078432 | A1 | 6/2002 | Charisius et al. |
| 2002/0108099 | A1 | 8/2002 | Paclat |
| 2003/0135840 | A1 | 7/2003 | Szabo et al. |
| 2003/0192029 | A1 | 10/2003 | Hughes |
| 2004/0054984 | A1 | 3/2004 | Chong et al. |
| 2004/0093595 | A1 | 5/2004 | Bilange |
| 2004/0221259 | A1 | 11/2004 | Devore et al. |
| 2005/0114830 | A1 | 5/2005 | Knutson et al. |
| 2006/0059253 | A1* | 3/2006 | Goodman et al. ............ 709/223 |
| 2006/0136832 | A1 | 6/2006 | Keller et al. |

(Continued)

*Primary Examiner* — Wei Zhen
*Assistant Examiner* — Mohammed Huda
(74) *Attorney, Agent, or Firm* — Goodwin Procter LLP

(57) ABSTRACT

A system for enabling submission of user feedback includes an extension to an application that is configured for execution on a computing system. The extension is for operation with the application and may be invoked during execution of the application in order to submit user feedback on a feature of the application substantially contemporaneously with a presentation of the feature to the user during execution of the application. The extension may visually identify a location of the feature on a user's screen and display on the user's screen textual input, received from the user, concerning the feature.

2 Claims, 5 Drawing Sheets

(56) References Cited

U.S. PATENT DOCUMENTS

2006/0184410 A1\* 8/2006 Ramamurthy et al. ........... 705/8
2007/0294660 A1  12/2007 Chong et al.
2008/0092060 A1\* 4/2008 Berg et al. ................... 715/748
2009/0034805 A1\* 2/2009 Perlmutter et al. ........... 382/118

\* cited by examiner

SYSTEMS AND METHODS FOR GATHERING AND PROCESSING USER FEEDBACK

CROSS-REFERENCE TO RELATED APPLICATION

This application claims priority to and the benefit of, and incorporates herein by reference in its entirety, U.S. Provisional Patent Application No. 60/946,078, which was filed on Jun. 25, 2007.

TECHNICAL FIELD

In various embodiments, the invention relates to systems and methods for gathering and processing user feedback on an enterprise application. More particularly, described herein are systems and methods that enable enterprise application end-users to submit feedback concerning enterprise applications running in a production environment, and that enable application owners to reconstruct the information sent by the application end-users into a visual representation that accurately matches the application screen that the end-user was working on when the feedback was submitted.

BACKGROUND

Organizations that develop and employ enterprise software (e.g., software that is employed in a large organization and that models the organization's business enterprise to address an enterprise-level issue) typically include three environments: i) a development environment where developers create applications; ii) a quality control environment where quality specialists test the applications created by the developers to reduce the number of errors present in the applications; and iii) a production environment where end-users employ the applications to perform their work. End-user tests are typically performed in either the development or quality control environments, before the applications are employed in the production environment. A persistent problem in such organizations is that many flaws in the applications are not perceived until the applications are employed in the production environment on a daily basis.

Unfortunately, most enterprise applications do not provide a single point of contact for an end-user in the production environment to submit feedback on an application, such as suggestions for enhancing productivity and improving application usability. Typically, a user executing an application in a production environment must leave the application and submit his feedback through another, different, program or medium. For example, to date, feedback is generally submitted through several different channels, such as e-mail, web forms, web forums, and informal conversations. In addition, these communication channels fail to provide an easy way for end-users in the production environment to provide a visual representation of the feedback. In particular, end-users do not have a simple mechanism for transmitting the application screen and for referring to a location on the screen.

SUMMARY OF THE INVENTION

In one embodiment, the present invention features systems and methods that enable end-users in a production environment to submit feedback on an enterprise application, such as suggestions for enhancing productivity and improving the application's usability. In accordance with embodiments of the invention, the users need not leave or close down the application and access another program or medium in order to submit their feedback on the application. Rather, the users are able to employ an extension to the application to submit their feedback in real-time while still within the application itself (i.e., while still executing the application). In particular, embodiments of the present invention improve the process of collecting feedback from end-users in the production environment by enabling the end-users to provide a representation of their screen, to identify the position of the screen they are referring to, and to provide textual information concerning their feedback.

In various embodiments, in addition to other features described below, the present invention facilitates the communication of end-user feedback via the internet, provides for central storage of the end-user feedback, and provides tools for analyzing the end-user feedback that was submitted. The end-user feedback may include both textual feedback and visual feedback concerning an entire application screen or an area of the screen.

In accordance with embodiments of the invention, a representation of the end-user application screen may be sent to a central server, the location of the screen referred to by an end-user may be sent to the central server, detailed information concerning the end-user application screen may be sent to the central server, the end-user application screen may be rebuilt using an application owner tool, and the location of the screen referred to by the end-user may be retrieved by the application owner tool.

In general, in one aspect, embodiments of the invention feature a system for enabling submission of user feedback. The system includes an extension to an application that is configured for execution on a computing system. The extension is for operation with the application and is configured for invocation during execution of the application in order to submit user feedback on a feature of the application substantially contemporaneously with a presentation of the feature to the user during execution of the application. In addition, the extension may be operated to visually identify a location of the feature on a user's screen and to display on the user's screen textual input, received from the user, concerning the feature. In one embodiment, the system further includes the application itself.

In general, in another aspect, embodiments of the invention feature a method for gathering user feedback. In accordance with the method, an application is executed on a computing system, a feature of the application is presented to a user during execution of the application, an extension to the application is invoked during execution of the application, and the extension is used to submit user feedback on the feature of the application substantially contemporaneously with the presentation of the feature to the user during execution of the application. In use, the extension visually identifies a location of the feature on a user's screen and displays on the user's screen textual input, received from the user, concerning the feature.

In various embodiments of these aspects of the invention, the extension captures the contents of the user's screen at the time the user feedback is submitted. The contents may then be transmitted to, and stored on, a central server. Moreover, an application tool may replicate the contents of the user's screen. For example, the application tool may replicate the visual identification of the location of the feature on the user's screen and/or may replicate the visual appearance of the textual input received from the user and displayed on the user's screen. The application tool may also be used to reply to the user feedback.

In another embodiment, the extension blocks the transmission of confidential information displayed by the application. The extension may also provide details to the user concerning the non-confidential information displayed by the application prior to transmitting such non-confidential information. In addition, the extension may identify a location of source code for the application, and the application tool may be used to access and modify the source code for the application.

In various embodiments, invocation of the extension is configurable based upon criteria such as, but not limited to, the type of application being executed, the type of data being generated by the application, an identity of an end-user accessing the application, a time-zone within which the end-user is located, a profile of the end-user, the time of day, system availability, and data external to the application and to the extension.

For its part, the application may be a web-based application or a desktop application. For example, the application may be an enterprise application executed in a production environment.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DESCRIPTION

In general, embodiments of the present invention pertain to systems and methods for gathering and processing user feedback on an enterprise application.

Figure 1:
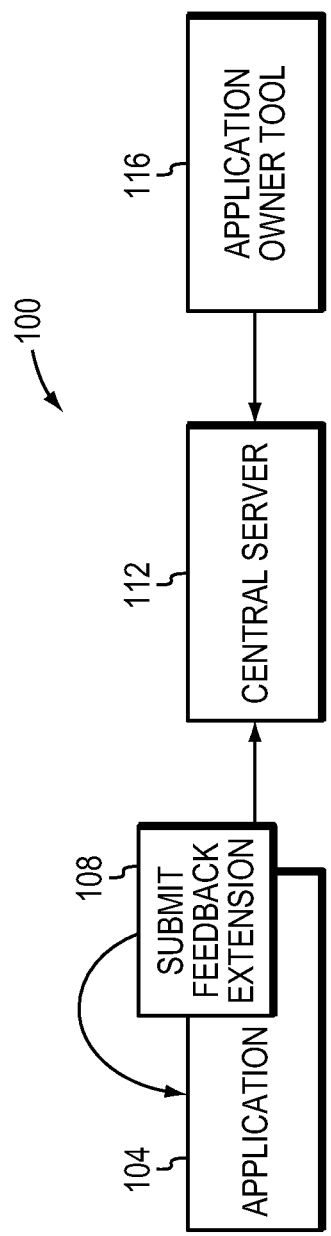
FIG. 1 is a block diagram of an illustrative embodiment of a system in accordance with the invention.

FIG. 1 depicts a system 100 in accordance with one embodiment of the invention. An application 104, for example an enterprise application, interfaces with an extension 108 to the application 104 that enables an end-user of the application 104 to submit feedback. In one embodiment, when the end-user begins submitting feedback, the submit feedback extension 108 collects information, including screen and environment information, about the running application 104. This information may then be sent to a central server 112 to be processed by one or more agents for the owner of the application 104.

The submit feedback extension 108 may be invoked by an end-user at any point during execution of the application 104, and, in one embodiment, allows the end-user to submit, to the central server 112, a copy of the application screen, textual information, and an identifier of a particular application screen location. Such feedback may be sent to the central server 112 on demand and may include information about the end-user environment that allows for a proper reconstruction of the end-user's screen by the application owner tool 116.

Following submission of the feedback to the central server 112, the agents of the application owner, or the application owner himself, may access the central server 112 with an application owner tool 116. The application owner tool 116 may be used, for example, to collect from the central server 112 information for reconstructing the application screen and the feedback that the end-user submitted, including system 100 information, information concerning the application 104, and the input added by the end-user. As described herein, the input added by the end-user may include, for example, textual feedback, a screen location identifier, and an email address for the end-user. The application owner tool 116 may then also replicate the application screen that the end-user was working on when the feedback was submitted.

Either or both the submit feedback extension 108 and the application owner tool 116 may be implemented as a software program that is capable of achieving the functionality described below. The application 104 and the submit feedback extension 108 may be implemented and executed on a first computing system, while the application owner tool 116 may be implemented and executed on a second computing system. Either or both the first computing system and the second computing system may be any type of personal computer, Windows-based terminal, network computer, wireless device, information appliance, RISC Power PC, X-device, workstation, mini computer, main frame computer, personal digital assistant, set top box, handheld device, or other computing device that is capable of both presenting information/data to, and receiving commands from, a user thereof. Each of the first and second computing systems may include, for example, a visual display device (e.g., a computer monitor), a data entry device (e.g., a keyboard), persistent and/or volatile storage (e.g., computer memory), a processor, and a mouse. In one embodiment, each of the first and second computing systems includes a web browser, such as, for example, the INTERNET EXPLORER program developed by Microsoft Corporation of Redmond, Wash., to connect to the World Wide Web.

For its part, the central server 112 may be any computing device that is capable of receiving information/data from the submit feedback extension 108 and delivering information/data to the application owner tool 116. In one embodiment, the central server 112 stores and manages collections of data.

In one embodiment, the first computing system (which includes the application 104 and the submit feedback extension 108), the central server 112, and the second computing system (which includes the application owner tool 116) communicate amongst themselves over one or more networks. Each network may be, for example, a local-area network (LAN), such as a company Intranet, a metropolitan area network (MAN), or a wide area network (WAN), such as the Internet. Each of the first and second computing systems and the central server 112 may be connected to the network(s) through a variety of connections including, but not limited to, standard telephone lines, LAN or WAN links (e.g., T1, T3, 56 kb, X.25), broadband connections (e.g., ISDN, Frame Relay, ATM), or wireless connections. The connections, moreover, may be established using a variety of communication protocols (e.g., HTTP, TCP/IP, IPX, SPX, NetBIOS, NetBEUI, SMB, Ethernet, ARCNET, Fiber Distributed Data Interface (FDDI), RS232, IEEE 802.11, IEEE 802.11a, IEEE 802.11b, IEEE 802.11g, and direct asynchronous connections).

It will be understood by those skilled in the art that FIG. 1 is a simplified illustration of the system 100 and that it is depicted as such to facilitate an explanation of the embodiments of the present invention. Moreover, the system 100 may be modified in of a variety of manners without departing from the spirit and scope of the invention. For example, the collections of data stored and managed by the central server 112 may in fact be stored and managed by several servers (not shown). As another example, the first computing system (which includes the application 104 and the submit feedback extension 108) and the central server 112 may be internal to a single organization or enterprise, and the second computing system (which includes the application owner tool 116) may be located external to the organization or enterprise. In such a case, the collections of data stored and managed by the central server 112 may be periodically communicated to, and synchronized with, another external server with which the application owner tool 116 of the second computing system is able to communicate. In one embodiment, this facilitates the handling of the end-user feedback by the second computing system located external to the organization or enterprise. As such, the depiction of the system 100 in FIG. 1 is non-limiting.

Figure 2A:
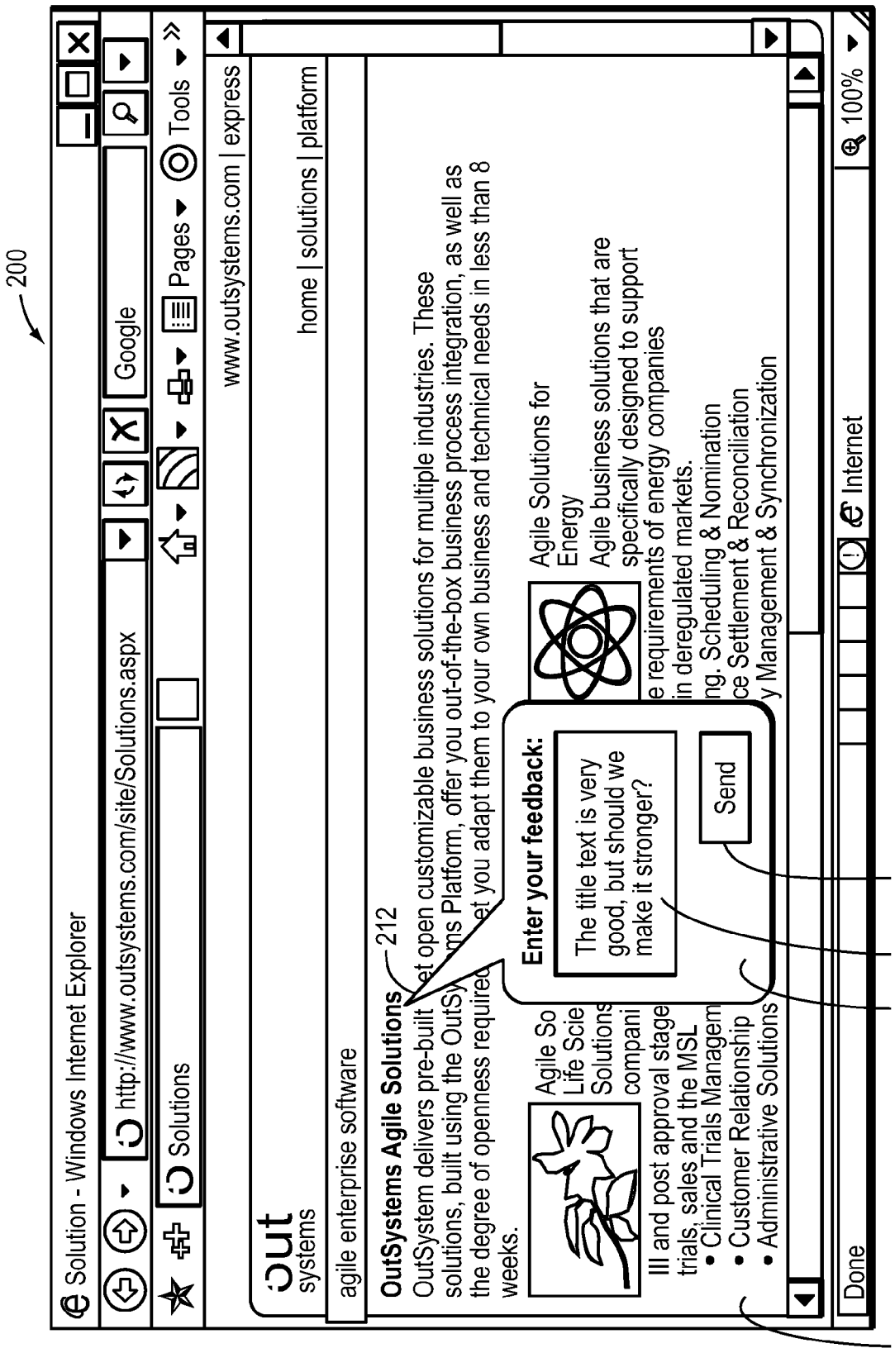
FIG. 2a illustrates a view of a screen that the end-user employs to submit feedback in accordance with one embodiment of the invention.
Figure 2B:
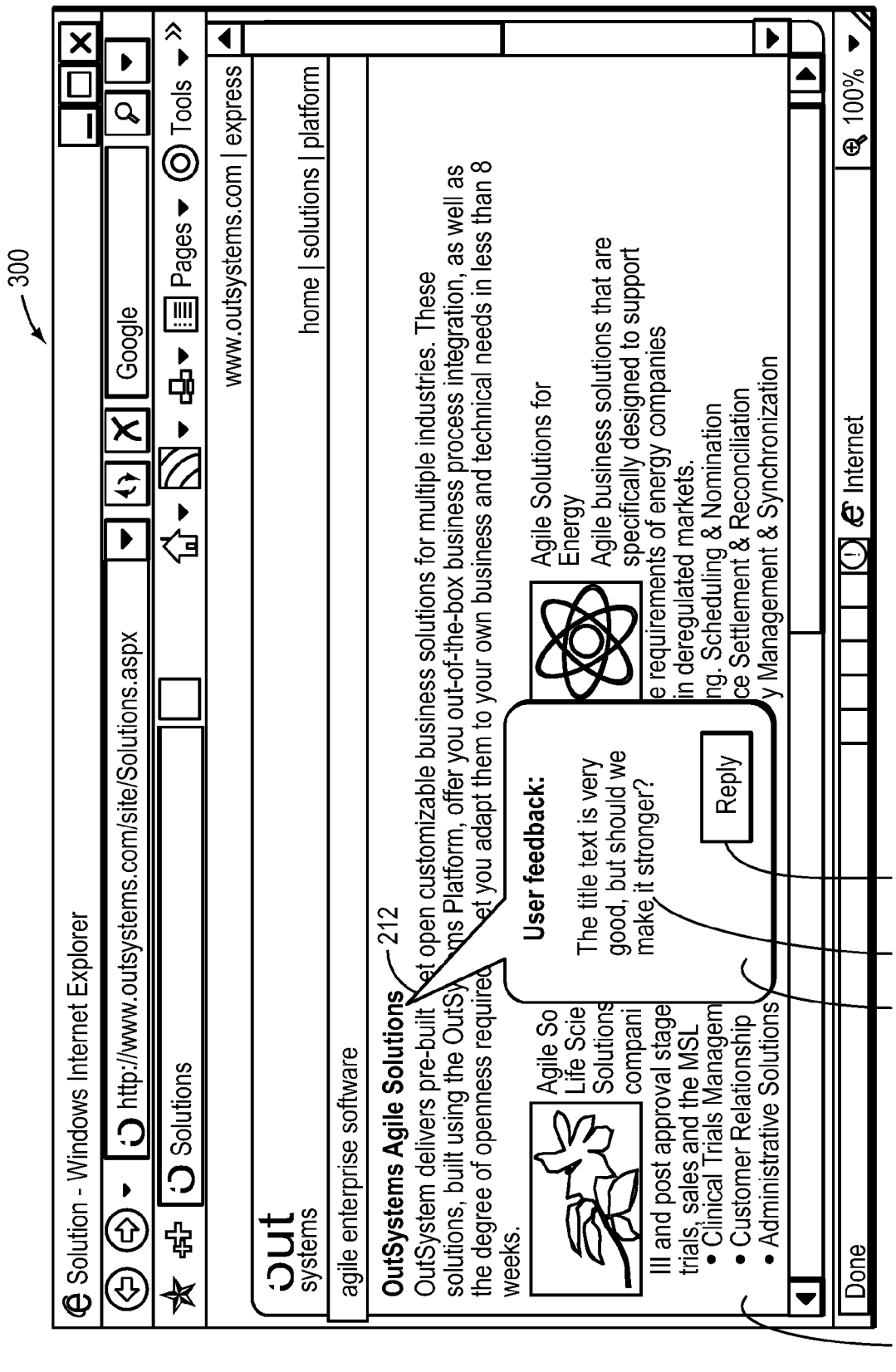
FIG. 2b illustrates a view of a screen that an agent employs to analyze the feedback submitted by the end-user in accordance with one embodiment of the invention.

FIG. 2a illustrates a view of a screen 200 that the end-user employs to submit feedback in accordance with one embodiment of the invention, while FIG. 2b illustrates a view of a screen 300 that an agent employs to analyze the feedback submitted by the end-user in accordance with one embodiment of the invention. In one embodiment, the end-user that employs the feedback feature 108 executes a web based enterprise application 204 and uses a submit feedback artifact 208 to point out the exact location 212 of the web based enterprise application 204 that he or she wishes to make reference to. The end-user may then add textual information 216 concerning the identified location 212 to the artifact 208. The information collected by the submit feedback extension 108 may then be sent to the central server 112 when, for example, the end-user selects a "send" button 220 or another input mechanism.

Referring now to FIG. 2b, when an agent who deals with end-user feedback starts analyzing an end-user request, a copy 304 of the screen 204 that the end-user was working on when he submitted his feedback is displayed to the agent on the agent's screen. In one embodiment, a feedback report artifact 308 that points to the location 212 identified by the end-user when he submitted his feedback overlays the copy 304 of the end-user application screen 204. The textual information 216 submitted by the end-user is also presented to the agent and the agent has the ability to reply to the feedback submitted by the end-user by, for example, selecting a "reply" button 312 or another reply mechanism.

Figure 3:
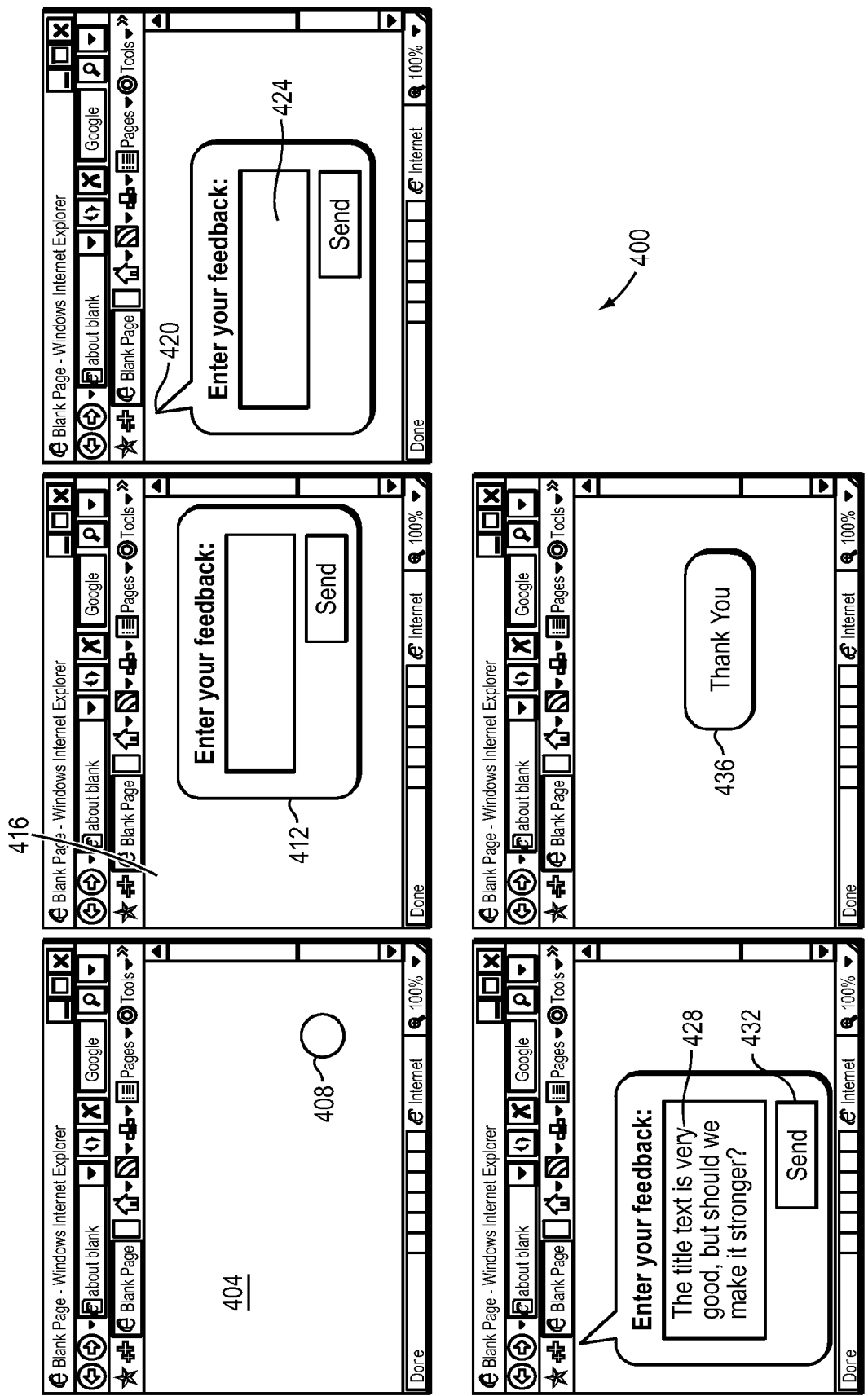
FIG. 3 illustrates a work flow that an end-user follows to submit feedback to a central server in accordance with one embodiment of the invention.

FIG. 3 illustrates a work flow 400 that an end-user follows to submit feedback to the central server 112 in accordance with one embodiment of the invention. In one embodiment, the end-user employs a web based enterprise application 404 that has a first artifact 408 present. The first artifact 408 allows the user to start the submit feedback process during execution of the application 104. In accordance with this embodiment, when the end-user selects the first artifact 408, a different second artifact 412 (e.g., a submit feedback artifact) is displayed to the end-user. The submit feedback artifact 412 allows the end-user to select a location of the screen that he or she wants to submit feedback on. By selecting a location 416 on the screen, the submit feedback artifact 412 may be re-positioned and an indication 420 of the selected location may be displayed to the end-user. The end user may then add textual information in a text area 424 of the submit feedback artifact 412. Optionally, the end-user may select another location on the screen of the web based application 404 to re-position the screen location indicator 420 of the submit feedback artifact 412. After the end-user enters textual information 428 regarding the feedback he is submitting, the end-user may select a "send" button 432 or another input mechanism. In one embodiment, by doing so, the end-user submits information to the central server 112 for analysis at a later stage. To inform the end-user that the feedback was successfully submitted to the central server 112, a message 436 stating success or thanking the end-user may be displayed.

Figure 4:
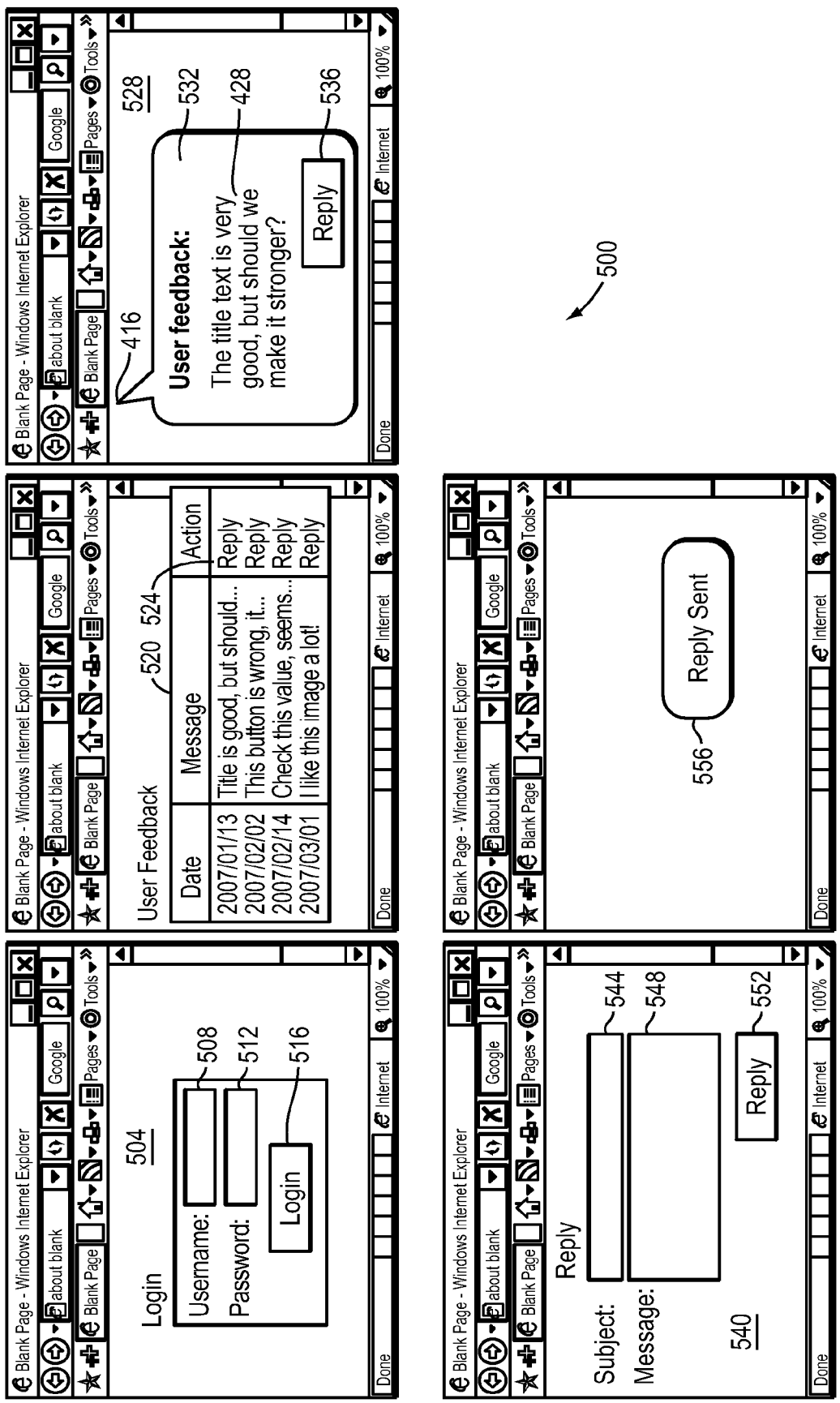
FIG. 4 illustrates a work flow that an agent follows to analyze and reply to the feedback submitted by an end-user in accordance with one embodiment of the invention.

FIG. 4 illustrates a work flow 500 that an agent follows to analyze and reply to the feedback submitted by an end-user in accordance with one embodiment of the invention. In one embodiment, the agent accesses a login page 504 where he fills in a username 508 and password 512 assigned to him, and selects an authentication mechanism, such as a "login" button 516. The agent may then be presented with a list 520 of feedbacks submitted by the end-users and may select the end-user feedback he or she wants to address by selecting a link 524 in the application. In one embodiment, a screen 528 representing a replica of the web based application 404 screen that the end-user was working on is displayed to the agent. An artifact 532 that points to the location 416 of the screen 528 that the end-user identified may be overlaid on the screen 528. In accordance with one embodiment of the invention, the application owner tool 116 uses the information submitted by the end-user to present to the agent a correctly replicated view of the end-user's web based application 404 and identified screen location 416, despite any differences that may exist between the end-user's and agent's hardware or software configurations. The artifact 532 may also include the textual information 428 submitted by the end-user so that the agent may better inspect the end-user feedback. In one embodiment, once the agent is ready to reply to the end-user, the agent may select a reply mechanism, such as a reply button 536. A new screen 540 requesting a reply may then be displayed. In this new screen 540 the agent may fill in, in a subject field 544, a subject of the reply and, in a response field 548, a response to the end-user. The agent may then select a "send" button 552 or another mechanism to indicate that the reply is to be sent to the end-user. If the reply is successfully sent to the end-user, a message 556 with information indicating that the reply was successfully sent may be displayed to the agent.

As described herein, the systems and methods may be employed to enable application end-users to submit feedback concerning an application 104 while the application 104 is running in the production environment, as opposed to when the application 104 is being developed in the development environment or is being tested in the quality control environment. In accordance with one feature of the invention, an end-user may send the application screen that he wishes to comment on, as well as a representation of the particular location of the application screen that he wishes to comment on and textual information conveying his comments. As explained, the end-user need not leave or close down the application 104 or access another program or medium in order to submit his feedback on the application 104. Rather, the end-user is able to employ the extension 108 to the application 104 to submit his feedback in real-time while still within the application 104 itself (i.e., while still executing the application 104). Embodiments of the present invention also enable application owners to reconstruct the information sent by the application end-user into a visual representation that accurately replicates the application screen that the end-user was working on when the feedback was submitted.

As described, embodiments of the present invention may be provided as an extension 108 to an existing application 104, enabling end-users to send textual and visual feedback about that existing application 104 to the central server 112. The extension 108 may be added to the existing application 104 and be configured for activation by, for example, adding an selectable option into the application 104 in the form of a button, a menu, or another selectable visual element. Alternatively, the extension 108 may be added to the existing application 104 and be activated by configuration only, thereby allowing application owners to enable the extension 108 without making changes to the application 104, and furthermore enabling application owners to control invokation of the extension 108 based upon predefined criteria. For example, the extension 108 may be configured to be activated (i.e., invoked) or deactivated for specific types of applications 104, specific types of data generated by the application 104, specific end-users of the application 104, and/or specific time frames during the day, or be configured to be activated (i.e., invoked) or deactivated based upon the time-zone within which an end-user is located, the end-user's profile, the availability of the components within the system 100 (e.g., the central server 112), and/or based upon data external to the system 100. Those skilled in the art will understand that other criteria for activating or deactivating the extension 108 may also be employed. In one embodiment, when activated (i.e., invoked) the extension 108 is displayed to the end-user, and when deactivated the extension 108 is hidden from the end-user.

In addition, the look-and-feel of the extension 108 may be configurable by the owner of the application 104. For example, the owner of the application 104 may create a theme for the submit feedback extension 108 that is particular to the specific look of the application 104.

In one embodiment, in order to protect the end-user's privacy, the extension 108 to the application 104 is parameterized to transmit only non-confidential information and, if desired, to inform the end-user about the details of the data being sent to the central server 112. For example, at various stages of execution, the application 104 may prompt an end-user for a password or other personal and sensitive confidential information. The extension 108 may be configured to block transmission of such information when the feedback is provided to the central server 112. As another example, the application 104 itself may display confidential information in use, such as one or more individuals' (including, for example, the end-user's) social security numbers. In such a case, the extension 108 may block transmission of the portions of the end-user's screen displaying such confidential information. For example, in transmitting a copy of the end-user's screen to the central server 112, the extension 108 may redact that confidential information therefrom. Optionally, prior to transmitting such redacted screen to the central server 112, the extension 108 may present a view of the redacted screen to the end-user so that the end-user is aware of the non-confidential information that will be transmitted and the confidential information whose transmission will be redacted and blocked. The extension 108 may also be configured so as to seek the end-user's confirmation that the redacted screen may be transmitted.

As described, embodiments of the present invention also provide a tool 116 to recover the information sent by the end-user to the central server 112. The tool 116 may use the textual information provided by the end-user, the data about the screen that the end-user was accessing, and the particular location of the screen the end-user identified to provide a visual representation of the end-user's feedback to an agent of the application owner. In one embodiment, the tool 116 enables application owners to replicate the application screen that the end-user was working on, regardless of differences between the end-user's and application owners' hardware and software specifications. The tool 116 may also ensure that the identified location on the screen that is presented to the application owner is consistent with the location of the screen identified by the end-user, regardless of differences between the end-user's and application owners' hardware and software specifications.

In one embodiment, the submit feedback extension 108 is installed and distributed with the application 104, while the central server 112 is installed in an environment that may be accessed by an end-user community. For its part, the application owner tool 116 may be installed as an intranet web application or installed on the agents' desktops.

Advantageously, embodiments of the present invention reduce the time and cost of gathering and processing user feedback. By providing an easy way for end-users to submit an application screen, along with an identified location on the screen and textual feedback, ambiguity in the support and feature gathering process for an application is minimized. Unnecessary and potentially expensive iterations with end-users are avoided. Moreover, embodiments of the present invention enable end-users to dramatically increase the clarity of their feedback. In particular, the ability to mark an area of the screen often facilitates the end-user's task of specifying errors and making suggestions for improving the application 104.

In addition, the application owner tool 116, which is used to rebuild the end-user application screen 204 and to specify the location 212 of the screen 204 that the end-user identified, significantly reduces the communications between the end-users and the application owners, particularly the communications that would otherwise be necessary for obtaining more clear and specific information from the end-users. The existence of a localized and easily accessible feedback point also fosters end-user feedback, and both the quantity and quality of end-user feedback is improved when compared to approaches that do not have the capability to submit visual feedback.

In addition, the systems and methods described herein may be extended to support automatic change operations. For example, by using the submit feedback extension module 108 to provide additional information about the location of the source code for the application 104 that the end-user refers to, the agent working on behalf of the application owner may access the source code for the application. In one such embodiment, for example by selecting a button or other input mechanism presented by the application owner tool 116, the agent may access the source code for the application, make the desired change in the appropriate location of the source code, and release an updated version of the application into the production environment.

As will be understood by one of ordinary skill in the art, embodiments of the present invention may be used not only to support web based applications, but also to support desktop applications. In addition, as described, embodiments of the present invention also address security and privacy concerns.

It should also be noted that embodiments of the present invention may be provided as one or more computer-readable programs embodied on or in one or more articles of manufacture. The article of manufacture may be a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A system for enabling submission of user feedback, the system comprising:

an extension to an application that is configured for execution on a computing system, the extension for operation with the application and configured for invocation during execution of the application by a user selection of the extension in order to submit user feedback on a feature of the application substantially contemporaneously with a presentation of the feature to the user during execution of the application, the user feedback being directed towards improving the feature of the application, and the extension operable to visually identify a location of the feature on a user's screen and to display on the user's screen textual input, received from the user providing the user feedback, concerning the feature, wherein the extension is further configured to capture contents of the user's screen at the time the user feedback is submitted; and an application tool configured to replicate the contents of the user's screen, wherein the application tool is further configured to reply to the user feedback.

2. A method for gathering user feedback, the method comprising:

executing an application on a computing system;

presenting to a user, during execution of the application, a feature of the application;

invoking an extension to the application during execution of the application and upon receiving a user selection of the extension;

using the extension to submit user feedback on the feature of the application substantially contemporaneously with the presentation of the feature to the user during execution of the application, the user feedback being directed towards improving the feature of the application, wherein the extension, in use, visually identifies a location of the feature on a user's screen and displays on the user's screen textual input, received from the user providing the user feedback, concerning the feature; and replying to the user feedback.

* * * * *